United States Patent [19]

Wright

[11] Patent Number: 4,992,497

[45] Date of Patent: Feb. 12, 1991

[54] GLASS FILLED POLY(ARYLENE SULFIDE) COMPOSITIONS AND METHODS

[75] Inventor: Roy F. Wright, Bartlesville, Okla.

[73] Assignee: Phillips Petroleum Company, Bartlesville, Okla.

[21] Appl. No.: 335,999

[22] Filed: Apr. 10, 1989

[51] Int. Cl.$^5$ ................................................ C08K 5/51
[52] U.S. Cl. ...................................... 524/147; 524/151; 524/152; 524/262; 524/265; 524/267; 524/609; 524/423; 524/451
[58] Field of Search ............... 524/609, 262, 265, 147, 524/151, 152

[56] References Cited

U.S. PATENT DOCUMENTS

| | | | |
|---|---|---|---|
| 3,658,753 | 4/1972 | Reed et al. | 260/45.7 P |
| 3,884,873 | 5/1975 | Short | 524/609 |
| 4,176,098 | 11/1979 | Needham | 260/18 R |
| 4,284,550 | 8/1981 | Mizuno et al. | 524/423 |
| 4,337,182 | 6/1982 | Needham | 524/609 |
| 4,365,037 | 12/1982 | Adachi et al. | 524/609 |
| 4,504,551 | 3/1985 | Leland | 428/419 |
| 4,528,310 | 7/1985 | Blackwell | 524/86 |
| 4,529,769 | 7/1985 | Johnson et al. | 524/425 |
| 4,678,826 | 7/1987 | Pastor et al. | 524/104 |
| 4,680,326 | 7/1987 | Leland et al. | 524/106 |
| 4,703,074 | 10/1987 | Izutsu et al. | 524/262 |
| 4,743,638 | 5/1988 | Bier et al. | 524/141 |
| 4,743,639 | 5/1988 | Liang | 524/262 |
| 4,892,930 | 1/1990 | Liang | 528/487 |

Primary Examiner—Joseph L. Schofer
Assistant Examiner—Mark D. Sweet
Attorney, Agent, or Firm—Laney, Dougherty, Hessin & Beavers

[57] ABSTRACT

The present invention relates to glass filled poly(arylene sulfide) molding compositions which upon being molded result in products having improved mechanical properties. Methods of preparing the compositions, methods of using the compositions to form molded products and the molded products so produced are also provided. The compositions are comprised of poly(arylene sulfide) resin, glass reinforcement material, an epoxysilane and an organic phosphite.

23 Claims, No Drawings

GLASS FILLED POLY(ARYLENE SULFIDE) COMPOSITIONS AND METHODS

BACKGROUND OF THE INVENTION

1. Field of the Invention

The present invention relates to glass filled poly(arylene sulfide) thermoplastic compositions and methods of preparing and using such compositions to form molded products having improved mechanical properties.

2. Description of the Prior Art

Poly(arylene sulfide) resin is a chemical resistant, high temperature thermoplastic which is particularly suitable for forming molded parts used in industrial applications. Glass filled poly(arylene sulfide) products have good electrical insulation properties and are particularly suitable for producing parts utilized in electrical applications.

Glass filled poly(arylene sulfide) compositions containing one or more organic silanes have been developed and used heretofore. For example, U.S. Pat. No. 4,528,310 to Blackwell discloses the addition of certain organosilanes to glass filled poly(arylene sulfide) compositions to improve properties such as flow rate and hydrolytic stability. U.S. Pat. No. 4,504,551 to Leland discloses poly(arylene sulfide) compositions including at lease one specific polysulfide silane to improve the insulation properties of products molded therefrom. U.S. Pat. No. 4,680,326 to Leland discloses poly(arylene sulfide) compositions which include at least one organosilane compound containing an amino functional group to improve cracking resistance and electrical insulation.

Poly(arylene sulfide) compositions containing organic phosphites have also been known and used heretofore. For example, U.S. Pat. No. 3,658,753 discloses a poly(arylene sulfide) composition containing an organic phosphite which when molded does not include heat-induced discoloration.

While molded products produced from the above-described poly(arylene sulfide) compositions have good electrical insulation and other properties, there is a need for glass filled poly(arylene sulfide) compositions which when molded form products having improved mechanical properties, e.g., strength, elongation, impact resistance, etc.

SUMMARY OF THE INVENTION

By the present invention, glass filled poly(arylene sulfide) molding compositions are provided which upon being molded result in products having improved mechanical properties. Methods of preparing the compositions, methods of using the compositions to produce molded products and the molded products so produced are also provided.

The compositions of the present invention are comprised of poly(arylene sulfide) resin, glass reinforcement material, an epoxysilane and an organic phosphite. In general, the poly(arylene sulfide) resin is present in the composition in an amount in the range of from about 35% to about 85% by weight, the glass reinforcement material is present in an amount in the range of from about 15% to about 65% by weight, the epoxysilane is present in an amount in the range of from about 0.1% to about 2.0% by weight and the organic phosphite is present in an amount in the range of from about 0.1% to about 2.0% by weight. Particularly preferred components of the composition are poly(arylene sulfide), 3-glycidoxypropyltrimethoxysilane and tri(nonylphenyl) phosphite. The compositions can also include mineral fillers such as talc or calcium sulfate, and other additives.

It is, therefore, a general object of the present invention to provide improved glass filled poly(arylene sulfide) compositions and methods.

A further object of the present invention is the provision of glass filled poly(arylene sulfide) compositions which upon being molded result in products having improved mechanical properties, particularly, improved strength, elongation and impact resistance.

Other and further objects, features and advantages of the present invention will be readily apparent to those skilled in the art upon a reading of the description of preferred embodiments which follows.

DETAILED DESCRIPTION OF PREFERRED EMBODIMENTS

Molded products produced in accordance with the methods of the present invention using the compositions of the invention have unexpectedly significant increases in mechanical properties such as strength, elongation and impact resistance. The molded products can be used in a variety of applications including automotive under-the-hood components, electrical and electronic parts, appliance components, pump housings, impellers, valves, etc.

The compositions of the invention are comprised of poly(arylene sulfide), glass reinforcement material, an epoxysilane and an organic phosphite. In addition, the compositions can and generally do contain a mineral filler such as talc or calcium sulfate. The compositions can additionally contain, as desired, other reinforcing materials, plasticizers, pigments, additives, etc.

The term "poly(arylene sulfide)" is used herein to broadly designate arylene sulfide resins whether homopolymers, copolymers, terpolymers, and the like, or a blend of such polymers. The term "uncured or partially cured" is used herein with respect to the poly(arylene sulfide) polymers to mean that the molecular weight of the polymers can be increased by supplying sufficient energy thereto such as by the application of heat or an oxidizing atmosphere to the polymers. The polymers are in the uncured or partially cured state during their recovery after synthesis prior to drying and curing.

Poly(arylene sulfide) resins which are useful in accordance with the present invention are those described in U.S. Pat. Nos. 3,354,129; 3,919,177; 4,038,261; and 4,656,231. A particularly preferred poly(arylene sulfide) is poly(phenylene sulfide).

Generally, poly(phenylene sulfide) will have a melt flow of less than about 3,000 grams for 10 minutes as measured by the test described in ASTM D1238, condition 315/5.0. Particularly suitable poly(arylene sulfide) resins can be prepared in accordance with the teachings of the patents cited above, and particularly, in accordance with the process described in U.S. Pat. No. 4,038,261 wherein a minor amount of trichlorobenzene branching agent is utilized to achieve the desired melt flow. Preferred poly(arylene sulfide) resins useful in the present invention are those manufactured by Phillips Petroleum Company and marketed as RYTON ® poly(phenylene sulfide) resins having a melt flow of from about 10 to about 1,000 grams for 10 minutes as determined by the ASTM procedure referred to above. The most preferred poly(phenylene sulfide) resins are those recovered by a quench process, and particularly, as described in U.S. Pat. No. 4,415,729. Further, as will be described further hereinbelow, the organic phosphites utilized can be mixed with the poly(arylene sulfide) resin when the resin is in an uncured or partially cured state such as prior to drying and curing after recovery by the quench process.

Generally, poly(arylene sulfide) resin is utilized in a molding composition of this invention in an amount in the range of from about 35% to about 85% by weight. The term "% by weight" is used herein to mean the weight percent of a particular component based on the total weight of all of the components in the composition.

The glass reinforcement material can be selected from the group consisting of glass particles, glass fibers and hollow microspheric glass. The preferred glass reinforcement material is glass fibers. While there is a variety of glass fiber reinforcing materials available, those specifically developed for thermoplastic reinforcement applications are preferred. Particularly suitable glass fibers are those produced by Owens-Corning Corporation of Toledo, Ohio and marketed under the trade designation 497DB. Other glass fibers which are suitable are those marketed and designated G-filament by Owens-Corning Corporation and those manufactured by PPG Industries, Inc. of Pittsburg, Pa. and marketed under the trade designation PPG 3090, K-filament. The glass reinforcement material used is generally included in a composition of this invention in an amount in the range of from about 15% to about 65% by weight.

Suitable epoxysilanes for use in accordance with the present invention are represented by the formula:

$$Z_m-X-\overset{(OR)_n}{\underset{R_{(3-n)}}{Si}}$$

wherein
Z is

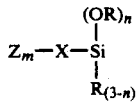
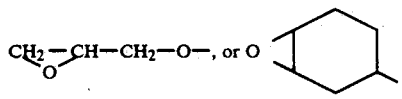

X is a linear or branched alkylene, arylene or arylalkylene hydrocarbon radical having from 1 to about 15 carbon atoms,
R is a hydrocarbon radical having from 1 to about 8 carbon atoms,
m is an integer of at least 1, and
n is an integer of 1 to 3.

Examples of such epoxysilanes are 3-glycidoxypropyltrimethoxysilane, beta-(3,4-epoxycyclohexyl)-ethyltrimethoxysilane, 3-glycidoxypropylmethyldiethoxysilane, and 2-glycidoxypropyltrimethoxysilane. The preferred epoxysilane is 3-glycidoxypropyltrimethoxysilane which is available from Union Carbide Corporation under the trade designation UCARSIL TM TC-100 ORGANOSILICON chemical. Generally, the epoxysilane utilized is included in a composition of the present invention in an amount in the range of from about 0.1% to about 2.0% by weight.

Suitable organic phosphites for use in accordance with this invention are those represented by the formula:

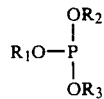

wherein
$R_1$ is an alkyl, aryl, cycloalkyl, alkylaryl, and arylalkyl radical having from 1 to about 20 carbon atoms, and
$R_2$ and $R_3$ are independently hydrogen or $R_1$.

Examples of such organic phosphites include isobutyl phosphite, ethyl phosphite, cyclohexyl phosphite, phenyl phosphite, tridecyl phosphite, eicosyl phosphite, 1-naphthyl phosphite, 2-phenanthryl phosphite, 1-(3,5,7-triethylanthrycyl) phosphite, di(2-phenylethyl) phosphite, di(hexadecyl) phosphite, dicyclopentyl phosphite, dioctyl phosphite, diethyl phosphite, di(tridecyl) phosphite, dibutyl phosphite, diphenyl phosphite, didecyl phosphite, cyclohexyldecylphenyl phosphite, trioctyl phosphite, trimethyl phosphite, triethyl phosphite, tributyl phosphite, triisobutyl phosphite, tri(sec-butyl) phosphite tri(tert-butyl) phosphite, trihexyl phosphite, tricyclohexyl phosphite, tri-(2-ethylhexyl) phosphite, triisooctyl phosphite, tri(tridecyl) phosphite, tri(heptadecyl) phosphite, tri(octadecyl) phosphite, trieicosyl phosphite, phenyldidecyl phosphite, phenyldi(hexadecyl) phosphite, phenyldi(nonadecyl) phosphite, diphenyldecyl phosphite, diphenylheptadecyl phosphite, diphenylnonadecyl phosphite, triphenyl phosphite, tri(p-octylphenyl) phosphite, tri(1-naphthyl) phosphite, tri(2-naphtyl) phosphite, tri(p-dodecylphenyl) phosphite, and the like, e.g., tri(nonylphenyl) phosphite.

Particularly suitable such organic phosphites are those selected from the group consisting of triisooctyl phosphite, tricyclohexyl phosphite, triphenyl phosphite and tri(nonylphenyl) phosphite. The most preferred organic phosphite is tri(nonylphenyl) phosphite. The particular organic phosphite used is utilized in a composition of this invention in an amount in the range of from about 0.1% to about 2.0% by weight.

A preferred composition of the present invention is comprised of poly(arylene sulfide) resin present in the composition in an amount in the range of from about 45% to about 75% by weight, glass fiber reinforcement material present in an amount in the range of from about 25% to about 55% by weight, an epoxysilane selected from the group consisting of 3-glycidoxypropyltrimethoxysilane, beta-(3,4-epoxycyclohexyl)-ethyltrimethoxysilane, 3-glycidoxypropylmethyldiethoxysilane, and 2-glycidoxypropyltrimethoxysilane present in an amount in the range of from about 0.3% to about 1.5% by weight, and an organic phosphite selected from the group consisting of triisooctyl phosphite, tricyclohexyl phosphite, triphenyl phosphite and tri(nonylphenyl) phosphite present in an amount in the range of from about 0.3% to about 1.5% by weight.

The most preferred composition of this invention is comprised of poly(phenylene sulfide) resin present in the composition in an amount in the range of from about 55% to about 65% by weight, glass fiber reinforcement material present in an amount in the range of from about 35% to about 45% by weight, 3-glycidoxypropyltrimethoxysilane present in an amount in the range of from about 0.3% to about 1.2% by weight and tri(nonylphenyl) phosphite present in an amount in the range of from about 0.3% to about 1.2% by weight.

The glass filled poly(arylene sulfide) composition can also contain one or more mineral fillers depending upon the particular use requirements involved. Suitable mineral fillers are those selected from the group consisting of talc, silica, clay, alumina, calcium sulfate, calcium carbonate, mica and mixtures thereof. The fillers can be in the form of, for example, powder, grain or fiber. The most preferred mineral filler is selected from the group consisting of calcium sulfate and talc. When a mineral filler is used in a composition of the present invention, it is included therein in an amount in the range of from about 5% to about 50% by weight, more preferably from about 15% to about 35% by weight.

A particularly preferred composition of this invention including a mineral filler is comprised of poly(phenylene sulfide) resin present in the composition in an amount in the range of from about 35% to about 55% by weight, glass fiber reinforcement material present in an amount in the range of from about 15% to about 30% by weight, 3-glycidoxypropyltrimethoxysilane present in an amount in the range of from about 0.3% to about 1.2% by weight, tri(nonylphenyl) phosphite present in an amount in the range of from about 0.3% to about 1.2% by weight and a mineral filler selected from the group consisting of calcium sulfate and talc present in an amount in the range of from about 15% to about 25% by weight.

As mentioned above, the molding compositions can include other additives including, but not limited to, pigments such as carbon black, mold corrosion inhibitors such as hydrotalcite (e.g., the hydrotalcite sold by Kyowa Chemical Co., Ltd. of Osaka, Japan under the trade designation DHT-4A) and processing aids such as polyethylene.

The molding compositions of this invention which upon being molded result in products having improved mechanical properties are prepared by mixing poly(arylene sulfide) resin, glass reinforcement material, an epoxysilane, an organic phosphite and mineral filler, if used, in the amounts set forth above to form a homogeneous mixture. As mentioned above, the organic phosphite can be mixed with poly(arylene sulfide) resin when the resin is in the uncured or partially cured state, e.g., prior to drying and curing the polymer. Many suitable methods of mixing the components are well-known to those skilled in the art. By way of example, the components of the compositions can be mixed together at room temperature in a rotating drum blender or in an intensive mixer such as a Henschel mixer to form a homogeneous mixture of components. Alternatively, the epoxysilane and organic phosphite can be premixed with the glass reinforcement material and filler, if used, before the poly(arylene sulfide) resin, and other components, if any, are combined to form a homogeneous mixture. The homogeneous mixture of components can be extrusion compounded at a temperature above the melting point of the resin to produce a uniform composition. The extrudate can be in strand, sheet, or tape form.

In preparing a molded product having improved mechanical properties, i.e., strength, elongation, impact resistance, etc., a molding composition of the present invention is prepared as described above. The composition is then molded in a known manner to form a desired product therefrom.

The following examples are presented to further illustrate the compositions and methods of this invention. The particular species and conditions employed in the examples are intended to be illustrative of the invention and not limiting thereto.

EXAMPLE 1

A mixture of 58.75% by weight poly(phenylene sulfide), (Phillips Petroleum Company RYTON® PPS, uncured, having a melt flow of 280 grams for 10 minutes measured in accordance with ASTM D1238, condition 315/5.0); 40% by weight glass fibers (K-filament 497DB sold by Owens-Corning Fiberglas Corporation); 0.25% by weight high density polyethylene (Phillips Petroleum Company MARLEX® TR161, density 0.962, melt index 30 grams/10 minutes); and 1% by weight of a hydrotalcite (Kyowa Chemical Industry Company DHT-4A) were dry blended and extruded through a Davis-Standard extruder, 1.5 inch diameter and 24:1 L:D ratio at a temperature in the range of about 610° F. to about 650° F. A metering screw with 3:1 compression ratio was used at 80 rpm. The melt was extruded through a strand die and chopped into coarse granules. The granules were heated in a forced air oven at 300° F. for 2 hours just before molding. The granules were then molded into test specimen Type 4 tensile and impact bars (5"×½"×⅛") in an Arburg 221E/170R injection molding machine. The mold temperature was about 275° F. and the molded specimen bars were then heated in an oven at 400° F. for 2 hours and then cooled to room temperature before testing for mechanical properties. Flexural strength was measured by ASTM D790, tensile strength and elongation by ASTM D638, impace resistance (Izod) by ASTM D256, hydrolytic stability by ASTM D638 after conditioning the test specimens for 150 hours at 250° F. in water at 15 psi, and insulation resistance by ASTM D257.

The results of the tests on the specimen bars produced from the above described composition are given in Table I below, Run 1.

For Run 2, a second composition was prepared, the components of which were the same as those in the Run 1 composition except that 57.75% by weight poly(phenylene sulfide) was used and 1.0% by weight tri(nonylphenyl) phosphite was included in the composition.

For Run 3, a third composition was prepared which was the same as the Run 2 composition except that 56.95% by weight poly(phenylene sulfide) was used and 1.8% by weight tri(nonylphenyl) phosphite was used.

For Run 4, a fourth composition was prepared which was the same as the Run 1 composition except that 56.95% by weight poly(phenylene sulfide) was used, and 1.0% by weight tri(nonylphenyl) phosphite was used and 0.8% by weight 3-glycidoxypropyltrimethoxysilane was included in the composition.

For Run 5, a fifth composition the same as the Run 1 composition was prepared except that 57.95% by weight poly(phenylene sulfide) was used and 0.8% by weight 3-glycidoxypropyltrimethoxysilane was included in the composition.

The various compositions used in Runs 1 through 5, and the results of tests for mechanical properties made on molded test specimen bars produced therefrom are shown in Table I below.

TABLE I
EFFECT OF EPOXYSILANE AND ORGANIC PHOSPHITE ON MECHANICAL PROPERTIES

| RUN | 1 | 2 | 3 | 4 | 5 |
|---|---|---|---|---|---|
| COMPOSITION | | | | | |
| Component, Weight % | | | | | |
| Poly(phenylene sulfide) | 58.75 | 57.75 | 56.95 | 56.95 | 57.95 |
| Glass fibers | 40.00 | 40.00 | 40.00 | 40.00 | 40.00 |
| Hydrotalcite | 1.00 | 1.00 | 1.00 | 1.00 | 1.00 |
| Polyethylene | 0.25 | 0.25 | 0.25 | 0.25 | 0.25 |
| Tri(nonylphenyl) phosphite | — | 1.00 | 1.80 | 1.00 | — |
| 3-glycidoxypropyltri-methoxysilane | — | — | — | 0.80 | 0.80 |
| MECHANICAL PROPERTIES | | | | | |
| Melt flow rate, g/10 min. | 43 | 45 | 37 | 18 | 36 |
| Flexural modulus, msi | 2.0 | 2.1 | 2.0 | 2.1 | 2.1 |
| Flexural strength, ksi | 26.7 | 32.4 | 33.3 | 38.2 | 34.6 |
| Tensile strength, ksi | 17.6 | 20.3 | 18.8 | 23.6 | 21.6 |
| Elongation, % | 1.03 | 1.18 | 1.06 | 1.35 | 1.27 |
| Impact resistance, ft-lb/in | | | | | |
| notched Izod | 1.4 | 1.6 | 1.6 | 1.6 | 1.8 |
| unnotched Izod | 6.6 | 9.3 | 9.5 | 10.4 | 10.0 |
| Hydrolytic stability aged tensile, ksi | 12.9 | 13.4 | 15.6 | 14.0 | 11.2 |
| Insulation resistance, ohms | 4E8 | (a) | (a) | 7E9 | (a) |

(a) Not tested

From Table I it can be seen that the composition of Run 4 which included both tri(nonylphenyl) phosphite and 3-glycidoxypropyltrimethoxysilane produced molded test specimens having improved mechanical properties.

EXAMPLE 2

The preparation of molding compositions and the testing of molded specimen bars as described in Example 1 were repeated except that the poly(phenylene sulfide) used was uncured Phillips Petroleum Co. RYTON® PPS having a melt flow of 300 gm/10 min. and the fifth run was omitted. The results of the tests are set forth in Table II below.

TABLE II
EFFECT OF EPOXYSILANE AND ORGANIC PHOSPHITE ON MECHANICAL PROPERTIES

| RUN | 1 | 2 | 3 | 4 |
|---|---|---|---|---|
| COMPOSITION | | | | |
| Component, Weight % | | | | |
| Poly(phenylene sulfide) | 58.75 | 57.75 | 56.95 | 56.95 |
| Glass fibers | 40.00 | 40.00 | 40.00 | 40.00 |
| Hydrotalcite | 1.00 | 1.00 | 1.00 | 1.00 |
| Polyethylene | 0.25 | 0.25 | 0.25 | 0.25 |
| Tri(nonylphenyl) phosphite | — | 1.00 | 1.00 | 1.80 |
| 3-glycidoxypropyltri-methoxysilane | — | — | 0.80 | — |
| MECHANICAL PROPERTIES | | | | |
| Melt flow rate, g./10 min. | 50 | 47 | 16 | 52 |
| Spiral flow, inch | 14.8 | 16.3 | 16.3 | — |
| Flexural modulus, msi | 2.0 | 2.1 | 2.1 | 2.1 |
| Flexural strength, ksi | 30.6 | 34.8 | 37.6 | 33.3 |
| Tensile strength, ksi | 19.9 | 21.2 | 24.6 | 21.6 |
| Elongation, % | 1.1 | 1.2 | 1.4 | 1.2 |
| Impact resistance, ft-lb/in | | | | |
| notched Izod | 1.4 | 1.6 | 1.4 | 1.5 |
| unnotched Izod | 7.5 | 9.1 | 9.4 | 8.9 |
| 150C tensile, ksi | 7.1 | 8.2 | 8.8 | — |
| Hydrolytic stability aged tensile, ksi | 14.4 | 19.5 | 17.3 | 19.3 |

From Table II it can be seen that the molded bars produced from the composition which included both tri(nonylphenyl) phosphite and 3-glycidoxypropyltrimethoxysilane had the best mechanical properties.

EXAMPLE 3

The preparation of molding compositions and the testing of molded specimen bars therefrom as described in Example 1 were repeated except that Phillips Petroleum Co. RYTON® cured poly(phenylene sulfide) having a melt flow of 160 gm/10 min. was used. The results of the tests are set forth in Table III below.

TABLE III
EFFECT OF EPOXYSILANE AND ORGANIC PHOSPHITE ON MECHANICAL PROPERTIES

| RUN | 1 | 2 | 3 | 4 | 5 |
|---|---|---|---|---|---|
| COMPOSITION | | | | | |
| Component Weight % | | | | | |
| Poly(phenylene sulfide) | 58.75 | 57.75 | 56.95 | 56.95 | 57.95 |
| Glass fibers | 40.00 | 40.00 | 40.00 | 40.00 | 40.00 |
| Hydrotalcite | 1.00 | 1.00 | 1.00 | 1.00 | 1.00 |
| Polyethylene | 0.25 | 0.25 | 0.25 | 0.25 | 0.25 |
| Tri(nonylphenyl) phosphite | — | 1.00 | 1.80 | 1.00 | — |
| 3-glycidoxypropyltri-methoxysilane | — | — | — | 0.80 | 0.80 |
| MECHANICAL PROPERTIES | | | | | |
| Melt flow rate, g/10 min. | 47 | 39 | 41 | 13 | 15 |
| Flexural modulus, msi | 2.0 | 2.0 | 2.0 | 2.1 | 2.1 |
| Flexural strength, ksi | 29.3 | 33.1 | 33.6 | 39.0 | 39.5 |
| Tensile strength, ksi | 16.5 | 19.9 | 20.2 | 22.7 | 24.0 |
| Elongation, % | 0.00 | 1.21 | 1.20 | 1.27 | 1.47 |
| Impact resistance, ft-lb/in | | | | | |
| notched Izod | 1.4 | 1.5 | 1.4 | 1.7 | 1.9 |
| unnotched Izod | 8.6 | 10.0 | 9.0 | 12.3 | 14.6 |
| Hydrolytic stability aged tensile, ksi | 14.1 | 14.7 | 15.8 | 16.3 | 13.9 |
| Insulation resistance, ohms | 7E8 | 3E11 | (a) | 2E10 | (a) |

(a) Not Tested.

EXAMPLE 4

The preparation of molding compositions and the testing of molded specimen bars therefrom as described in Example 2 were repeated except that the poly(phenylene sulfide) used was cured and had a melt flow of 105 gm/10 min. The results of the tests are set forth in Table IV below.

TABLE IV
EFFECT OF EPOXYSILANE AND ORGANIC PHOSPHITE ON MECHANICAL PROPERTIES

| RUN | 1 | 2 | 3 | 4 |
|---|---|---|---|---|
| COMPOSITION | | | | |
| Component, Weight % | | | | |
| Poly(phenylene sulfide) | 58.75 | 57.75 | 56.95 | 56.95 |
| Glass fibers | 40.00 | 40.00 | 40.00 | 40.00 |
| Hydrotalcite | 1.00 | 1.00 | 1.00 | 1.00 |
| Polyethylene | 0.25 | 0.25 | 0.25 | 0.25 |
| Tri(nonylphenyl) phosphite | — | 1.00 | 1.00 | 1.80 |
| 3-glycidoxypropyltri-methoxysilane | — | — | 0.80 | — |
| MECHANICAL PROPERTIES | | | | |
| Melt flow rate, g./10 min. | 34 | 36 | 15 | 43 |
| Spiral flow, inch | 15.0 | 16.0 | 14.0 | — |
| Flexural modulus, msi | 2.1 | 2.1 | 2.1 | 2.0 |
| Flexural strength, ksi | 35.7 | 34.5 | 38.0 | 33.7 |
| Tensile strength, ksi | 22.8 | 21.4 | 25.4 | 21.6 |
| Elongation, % | 1.4 | 1.2 | 1.5 | 1.2 |
| Impact resistance, ft-lb/in | | | | |
| notched Izod | 1.5 | 1.4 | 1.4 | 1.2 |
| unnotched Izod | 10.5 | 10.0 | 11.8 | 8.8 |
| 150C tensile, ksi | 8.6 | 8.2 | 9.0 | — |
| Hydrolytic stability aged tensile, ksi | 19.6 | 19.2 | 20.4 | 19.1 |

EXAMPLE 5

The preparation of molding compositions and the testing of molded specimen bars therefrom were repeated except that the poly(phenylene sulfide) used was uncured (melt flow of 300 gm/10 min.) and the quantities of components were changed as indicated in Table V below. The results of the tests are also given in Table V.

TABLE V
EFFECT OF EPOXYSILANE AND ORGANIC PHOSPHITE ON MECHANICAL PROPERTIES

| RUN | 1 | 2 | 3 | 4 | 5 | 6 |
|---|---|---|---|---|---|---|
| COMPOSITION | | | | | | |
| Component, Weight % | | | | | | |
| Poly(phenylene sulfide) | 58.75 | 58.35 | 57.95 | 57.95 | 57.95 | 58.35 |
| Glass fibers | 40.00 | 40.00 | 40.00 | 40.00 | 40.00 | 40.00 |
| Hydrotalcite | 1.00 | 1.00 | 1.00 | 1.00 | 1.00 | 1.00 |
| Polyethylene | 0.25 | 0.25 | 0.25 | 0.25 | 0.25 | 0.25 |
| Tri(nonylphenyl) phosphite | — | 0.4 | 0.8 | 0.4 | 0.4 | — |
| 3-glycidoxypropyltrimethoxysilane | — | — | — | 0.4 | — | — |
| beta-(3,4-epoxycyclohexyl)-ethyltrimethoxysilane | — | — | — | — | 0.4 | 0.4 |
| MECHANICAL PROPERTIES | | | | | | |
| Melt flow rate, g/10 min. | 50 | 48 | 47 | 45 | 43 | 45 |
| Flexural modulus, msi | 2.0 | 2.1 | 2.0 | 2.1 | 2.1 | 2.0 |
| Flexural strength, ksi | 27.3 | 29.8 | 30.5 | 36.2 | 33.2 | 31.3 |
| Tensile strength, ksi | 17.6 | 18.0 | 18.5 | 21.5 | 20.2 | 19.0 |
| Elongation, % | 1.04 | 1.06 | 1.10 | 1.25 | 1.23 | 1.08 |
| Impact resistance, ft-lb/in | | | | | | |
| notched Izod | 1.3 | 1.3 | 1.5 | 1.7 | 1.5 | 1.5 |
| unnotched Izod | 6.3 | 7.0 | 7.8 | 10.2 | 8.7 | 6.4 |
| Hydrolytic stability aged tensile, ksi retained, % | 10.8 | 9.8 | 9.8 | 10.2 | 12.0 | 12.8 |
| | 61 | 54 | 53 | 47 | 59 | 67 |
| Insulation resistance, ohms | 8E8 | 1E10 | 3E10 | 5E9 | 2E10 | 2E10 |

From Tables III, IV and V, it can be seen that products molded from the compositions of the present invention have improved mechanical properties.

What is claimed is:

1. A glass-filled poly(arylene sulfide) composition having improved mechanical properties, comprising:
   poly(arylene sulfide) resin;
   glass reinforcement material in an amount in the range of from about 25% to about 55% by weight of said composition;
   an epoxysilane selected from 3-glycidoxypropyltrimethoxysilane, beta-(3,4-epoxycyclohexyl)-ethyltrimethoxysilane, 3-glycidoxypropylmethyldiethoxysilane, and 2-glycidoxypropyltrimethoxysilane; and
   an organic phosphite selected from triisooctyl phosphite, tricyclohexyl phosphite, triphenyl phosphite, and tri(nonylphenyl) phosphite,
   said epoxysilane being present in said composition in an amount in the range of from about 0.3% to about 1.5% by weight of said composition and said organic phosphite being present in said composition in an amount in the range of from about 0.3% to about 1.5% by weight of said composition so that said expoxysilane and said organic phosphite operate to improve the strength, elongation, and impact resistance properties of said composition.

2. The composition of claim 1 wherein said poly(arylene sulfide) resin is poly(phenylene sulfide).

3. The composition of claim 1 wherein said epoxysilane is 3-glycidoxypropyltrimethoxysilane.

4. The composition of claim 1 wherein said organic phosphite is tri(nonylphenyl) phosphite.

5. The composition of claim 1 further comprising a mineral filler.

6. The composition of claim 5 wherein said mineral filler is from about 5% to about 50% by weight of said composition.

7. The composition of claim 5 wherein said mineral filler is from about 15% to about 35% by weight of said composition.

8. The composition of claim 5 wherein said mineral filler is selected from calcium sulfate and talc.

9. A glass-filled poly(phenylene sulfide) composition, comprising:
   poly(phenylene sulfide) resin;
   glass fiber reinforcement material in an amount in the range of from about 35% to about 45% by weight of said composition;
   3-glycidoxypropyltrimethoxysilane; and
   tri(nonylphenyl) phosphite,
   said 3-glycidoxypropyltrimethoxysilane being present in said composition in an amount in the range of from about 0.3% to about 1.2% by weight of said composition and said tri(nonylphenyl) phosphite being present in said composition in an amount in the range of from about 0.3% to about 1.2% by weight of said composition so that said 3-glycidoxypropyltrimethoxysilane and said tri(nonylphenyl) phosphite operate to improve the strength, elongation, and impact resistance properties of said composition.

10. The composition of claim 9 further comprising a mineral filler.

11. The composition of claim 10 wherein said mineral filler is selected from calcium sulfate and talc.

12. A glass-filled poly(phenylene sulfide) composition containing a mineral filler and having improved mechanical properties, comprising:
   poly(phenylene sulfide) resin;
   glass reinforcement material in an amount in the range of from about 15% to about 30% by weight of said composition;
   3-glycidoxypropyltrimethoxysilane; and
   tri(nonylphenyl) phosphite,
   said mineral filler being present in said composition in an amount in the range of from about 15% to about 25% by weight of said composition, said mineral filler being selected from calcium sulfate and talc, and
   said 3-glycidoxypropyltrimethoxysilane being present in said composition in an amount in the range of from about 0.3% to about 1.2% by weight of said composition and said tri(nonylphenyl) phosphite being present in said composition in an amount in the range of from about 0.3% to about 1.2% by weight of said composition so that said 3-glycidoxypropyltrimethoxysilane and said tri(nonylphenyl) phosphite operate to improve the strength, elongation, and impact resistance properties of said composition.

13. A glass-filled poly(arylene sulfide) composition having improved mechanical properties, consisting essentially of poly(arylene sulfide) resin, glass reinforcement material in an amount in the range of from about 15% to about 65% by weight of said composition, an epoxysilane and an organic phosphite represented by the formula:

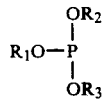

wherein:

$R_1$ is an alkyl, aryl, cycloalkyl, alkylaryl, or arylalkyl radical having from 1 to about 20 carbon atoms, and $R_2$ and $R_3$ are independently hydrogen or $R_1$, said epoxysilane being present in said composition in an amount in the range of from about 0.1% to about 2.0% by weight of said composition and said organic phosphite being present in said composition in an amount in the range of from about 0.1% to about 2.0% by weight of said composition so that said epoxysilane and said organic phosphite operate to improve the strength, elongation, and impact resistance properties of said composition.

14. The composition of claim 13 wherein said poly(arylene sulfide) is poly(phenylene sulfide).

15. The composition of claim 13 wherein said epoxysilane is represented by the formula

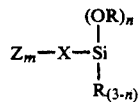

wherein
Z is

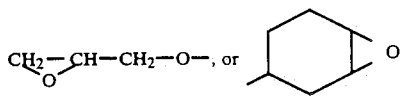

X is a linear or branched alkylene, arylene or arylalkylene hydrocarbon radical having from 1 to about 15 carbon atoms, R is a hydrocarbon radical having from 1 to about 8 carbon atoms, m is an integer of at least 1, and n is an integer of 1 to 3.

16. The composition of claim 13 wherein said epoxysilane is selected from the group consisting of 3-glycidoxypropyltrimethoxysilane, beta-(3,4-epoxycyclohexyl)-ethyltrimethoxysilane, [3-glycidoxypropyltrimethoxysilane] 3-glycidoxypropylmethyldiethoxysilane and 2-glycidoxypropyltrimethoxysilane.

17. The composition of claim 13 wherein said organic phosphite is selected from the group consisting of trisooctyl phosphite, tricyclohexyl phosphite, triphenyl phosphite and tri(nonylphenyl) phosphite.

18. The composition of claim 13 wherein said poly(arylene sulfide) is poly(phenylene sulfide) and is present in said composition in an amount in the range of from about 55% to about 65% by weight.

19. The composition of claim 18 wherein said epoxysilane is 3-glycidoxypropyltrimethoxysilane and is present in said composition in an amount in the range of from about 0.3% to about 1.2% by weight.

20. The composition of claim 19 wherein said organic phosphite is tri(nonylphenyl) phosphite and is present in said composition in an amount in the range of from about 0.3% to about 1.2% by weight.

21. The composition of claim 13 further consisting essentially of a mineral filler.

22. The composition of claim 21 wherein said mineral filler is selected from the group consisting of talc, silica, clay, alumina, calcium sulfate, calcium carbonate, mica and mixtures thereof.

23. The composition of claim 22 wherein said mineral filler is present in said composition in an amount in the range of from about 5% to about 50% by weight of said composition.

* * * * *

UNITED STATES PATENT AND TRADEMARK OFFICE
CERTIFICATE OF CORRECTION

PATENT NO. : 4,992,497

DATED : February 12, 1991

INVENTOR(S) : Roy F. Wright

It is certified that error appears in the above-identified patent and that said Letters Patent is hereby corrected as shown below:

Col. 6, line 35, change "impace" to --impact--;

Col. 8, Table III, line 15, after "Component" insert --,--;

Col. 12, claim 16, line 17-18, delete "[3-glycidoxypropyltrimethoxysilane]".

Signed and Sealed this

Eleventh Day of August, 1992

Attest:

DOUGLAS B. COMER

Attesting Officer

Acting Commissioner of Patents and Trademarks